Patented Mar. 8, 1938

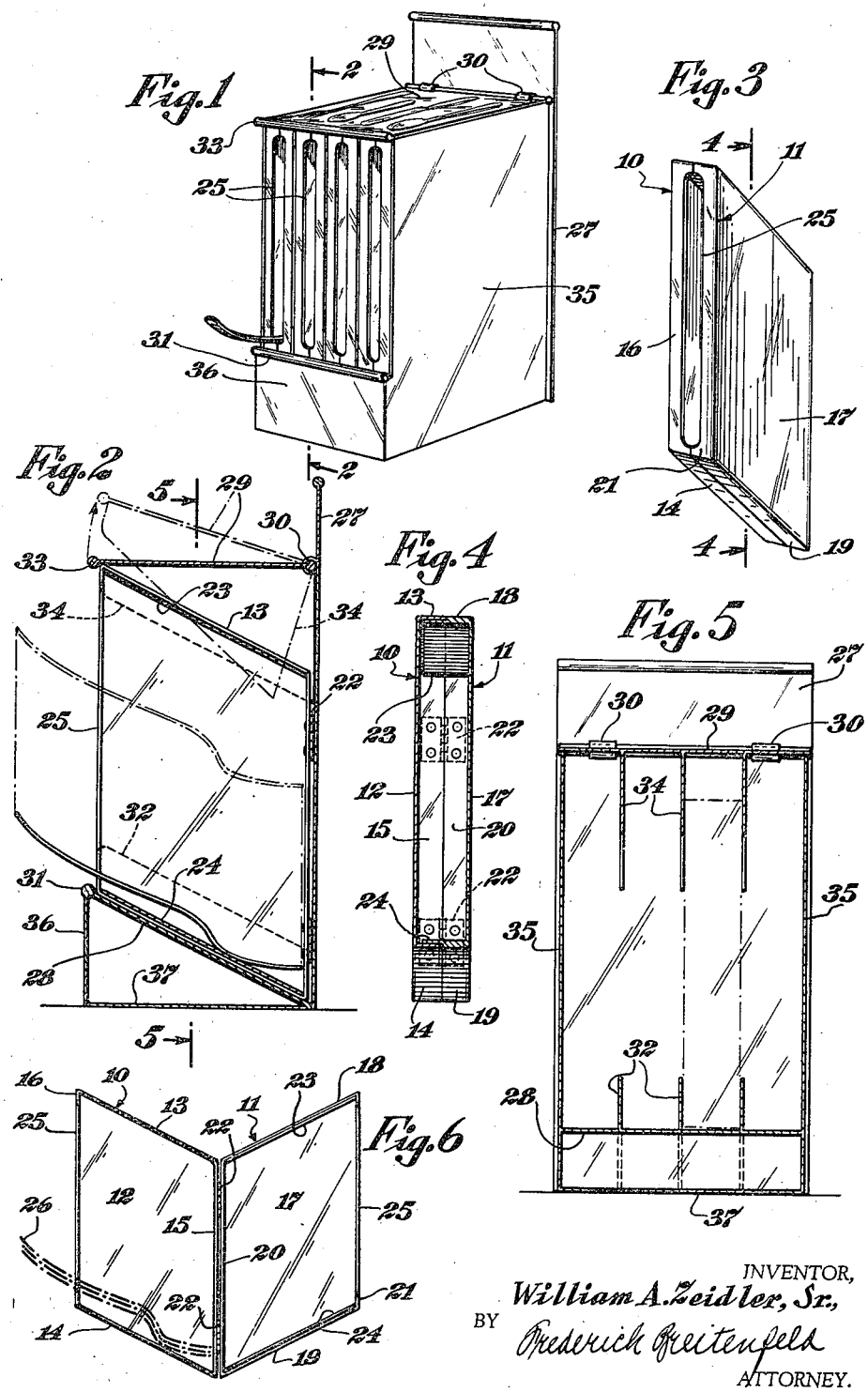

2,110,189

UNITED STATES PATENT OFFICE 2,110,189

DEVICE FOR DISPENSING TABLE IMPLEMENTS

William A. Zeidler, Sr., New York, N. Y.

Application April 16, 1936, Serial No. 74,607

12 Claims. (Cl. 312—42)

My present invention relates generally to dispensing cabinets, and has particular reference to an improved device for dispensing table implements such as knives, forks, and spoons.

The principal object of the invention is to provide a sanitary device adapted to be used in cafeterias and similar places to permit the accommodation of clean table implements. The device provides for the support of the implements in orderly stacks or groups; encloses and thereby conceals and protects the forward portions of the implements; and leaves the handles of the implements in accessible positions which enable a person to withdraw one or more desired implements without contacting those that are left behind.

Another object of the invention is to provide a device for accomplishing the foregoing purposes which is of staunch construction, attractive appearance, relatively inexpensive to manufacture, and easy to operate. A characterizing feature of the present invention resides in the employment of a flattened container adapted to accommodate a plurality of like implements in stacked relation, the inside width of the container being substantially equal to the width of the stack, and one end wall of the container having a longitudinal slit through which the handles of the implements project.

In accordance with my invention, the flat container which I employ is composed of two complementary separable sections which permit the container to be widely opened for purposes of cleaning and loading. More particularly, the container may be said to be split longitudinally to provide the two separable sections, and the slit through which the handles of the implements project is arranged coincident with the line of cleavage which separates the sections.

A particular feature of my invention lies in making the container substantially rhomboidal in shape so that its bottom wall is arranged at an obtuse angle to the front wall. In this way, the arrangement of the front slitted wall in a vertical plane disposes the bottom wall in an inclined relationship which helps to retain the implements within the container.

My invention contemplates the employment of a number of containers, and the provision of a common holder adapted to receive the containers endwise therein in side-by-side relationship, whereby each of the containers may be separately removed or inserted to permit separate cleaning and loading of each container.

I achieve the foregoing objects, and such other objects as may hereinafter appear or be pointed out, in the manner illustratively exemplified in the accompanying drawing, wherein—

Figure 1 is a perspective view of a device constructed in accordance with my present invention;

Figure 2 is a cross-sectional view taken substantially along the line 2—2 of Figure 1;

Figure 3 is a perspective view of one of the independent containers;

Figure 4 is a cross-sectional view taken substantially along the line 4—4 of Figure 3;

Figure 5 is a cross-sectional view taken substantially along the line 5—5 of Figure 2; and Figure 6 is an elevational view of the container of Figures 3 and 4, shown in opened condition.

One of the containers is illustrated most clearly in Figures 3, 4, and 6. It is made of metal or other suitable material and is composed of the two complementary sections 10 and 11. The section 10 has a flat wall portion 12 of substantially rhomboidal contour, a top wall portion 13, a bottom wall portion 14, a rear wall portion 15, and a front wall portion 16. The other section 11 has corresponding wall portions 17, 18, 19, 20, and 21. The sections are adapted to fit together in a separable manner to form the substantially closed container shown most clearly in Figure 3. In a preferred embodiment, the two sections are hingedly connected by means of the hinges 22 which connect the rear wall portions 15 and 20. To facilitate the snug closing of the container it is preferable to provide tongues 23 and 24 in association with the wall portions 18 and 19, these tongues being adapted to fit snugly alongside of the wall portions 13 and 14 when the container is closed.

The wall portions 16 and 21 are so contoured that when the container is closed, a longitudinal slit 25 is provided in the front wall of the container. It will be observed that the axis of the slit coincides with the line of cleavage between the two sections. Stated otherwise, the two complementary sections are disposed on opposite sides of the slit 25.

It will also be observed that the bottom wall of the container, composed of the wall portions 14 and 19, is arranged at an obtuse angle to the slitted front wall; and that the top wall, composed of the wall portions 13 and 18, is parallel to the bottom wall. This imparts a substantially rhomboidal shape to the container as a whole.

In use, the container is opened up into the condition shown in Figure 6, and a series of table implements, such as forks, knives, or spoons, may be quickly and expeditiously loaded into the container in the manner indicated by the dot-and-dash lines 26 of Figure 6. The inner or forward portions of the implements are disposed within the body of the container, and the rear or handle portions project outwardly through the longitudinal slit 25. After the container has been loaded to the desired extent, the two sections are brought together and the loaded container is then ready for insertion into the holder. The width of the container, i. e., the distance between the wall portions 12 and 17, is substantially equal to the width of the stack of implements which the container is to accommodate. In this way, the implements are retained in stacked relationship, but they may be withdrawn one by one by grasping the handle of the topmost implement, turning the implement through 90°, and withdrawing it endwise out of the slit 25.

In accordance with my invention, I provide a common holder for removably receiving one or more containers endwise therein in side-by-side relation. A holder of this character is illustrated most clearly in Figures 1, 2, and 5. In the embodiment illustrated, an upright support 27 is provided with the inclined base 28 and the cover element 29, the latter being pivotally connected, as at 30, to the upright support 27. The base 28 is inclined with respect to the horizontal, so that it is adapted to underlie and support the bottom walls of the containers which accommodate the implements. At its forward end, the base 28 is provided with the enlarged portion or bead 31 which disposes itself in front of the accommodated containers, thereby serving to retain the latter against inadvertent forward displacement. The base is also provided with the upwardly extending partitions or fins 32 which are so spaced that a single container may be snugly accommodated between each pair of adjacent fins.

The cover element is similarly provided at its forward end with an enlarged portion or bead 33 which fulfills the same function as the bead 31. A series of spaced depending fins 34 are carried by the cover element 29, these fins being aligned with the fins 32 of the base and serving to accommodate one container snugly between each pair of adjacent fins.

The cover element 29 is preferably arranged in a substantially horizontal plane, as shown most clearly in Figures 1 and 2; and by virtue of the fact that the accommodated containers have inclined upper walls, the fins 34 are of the trapezoidal shape shown most clearly in dot-and-dash lines in Figure 2.

The holder is preferably provided with the solid side walls 35, the upper and lower portions of which serve as end fins, but it will be understood that the walls 35 may be dispensed with and that end fins, shaped like the fins 32 and 34, may be used, if desired.

The cover element 29 is preferably weighted in any suitable manner, so that it tends to remain in its normal position, indicated in full-lines in Figure 2.

In the embodiment illustrated, I have illustratively shown a holder that is adapted to accommodate four containers in side-by-side relation. Obviously, a holder may be constructed or used which will accommodate only one container; or possibly more than four containers. Also, the upright support 27 may serve to support a duplicate base, cover element, etc. at the rear, thereby providing for the accommodation of containers on opposite sides of the upright support 27 to permit implements to be withdrawn from diametrically opposite positions.

Preferably, the cover element 29 is provided on its upper surface with embossings or depictions or similar indicia, indicating the nature of the implements accommodated in the respective containers, so that a person may readily withdraw a spoon, a fork, or the like by simply grasping the uppermost handle of the corresponding stack.

The advantages of the present construction will be obvious to those skilled in the art. When the device is in use, persons patronizing the cafeteria or the like may readily withdraw whatever implements they need without contacting with the forward portions of the remaining implements. When any one of the containers is empty, or is in need of cleaning, it is a relatively simple matter for the proprietor of an attendant to lift the cover element 29 into the dot-and-dash position shown in Figure 2, and thereupon to withdraw forwardly any one or more of the containers. The container may then be opened up wide, as shown in Figure 6, in which condition it is easy to clean thoroughly. The reloading is then readily accomplished, preferably in the kitchen; and when the container has been reloaded, it is reinserted into the holder by again lifting the cover element a slight degree, sliding the container rearwardly into its proper position, and dropping the cover element.

The beads 31 and 33 serve as latching means for holding the containers within the holder, to prevent accidental withdrawal of the container by patrons who might inadvertently exert too great a pull on one or more of the implements which they are withdrawing. It should be observed, however, that the latch is readily released by lifting the cover element 29 only slightly, and that during this release the rearward portions of the fins 34 still remain in their proper positions between the containers. Since these fins, together with the base fins 32, serve as means for holding the containers in closed relationship when they are in use, the withdrawal and reinsertion of any container into the holder may be carried out without any danger of having the other containers open up or become displaced.

I have illustratively shown the holder composed of sheet metal, the inclined base 28 being provided with the forward supporting wall 36 and the bottom wall 37. It will be understood, however, that this construction is merely illustrative of the general nature of the device, and that the broader phases of the invention are not restricted to these details.

In general, it will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a device for dispensing table implements such as knives, forks, and spoons, a flat container adapted to accommodate a plurality of like implements in stacked relation, the inside width of the container being substantially equal to the width of said stack, and one end wall of the container having a longitudinal slit through which the handles of the implements may project, said container comprising separable sections disposed on opposite sides of said slit to render the interior of the container accessible for loading and cleaning.

2. In a device for dispensing table implements such as knives, forks, and spoons, a flat container longitudinally split into separable sections and adapted to accommodate a plurality of like implements in stacked relation, one end wall of the container having a longitudinal slit coincident with the line of cleavage between said sections to permit the handles of said implements to project therethrough, and a holder for the container including means for retaining said sections in closed relation.

3. In a device for dispensing table implements such as knives, forks, and spoons, a flat container longitudinally split into separable sections and adapted to accommodate a plurality of like implements in stacked relation, one end wall of the container having a longitudinal slit coincident with the line of cleavage between said sections to permit the handles of said implements to project therethrough, and a holder for the container including means for retaining said sections in closed relation, said means comprising spaced fins adapted to snugly sandwich the container between them.

4. In a device for dispensing table implements such as knives, forks, and spoons, a flat container longitudinally split into separable sections and adapted to accommodate a plurality of like implements in stacked relation, one end wall of the container having a longitudinal slit coincident with the line of cleavage between said sections to permit the handles of said implements to project therethrough, and a holder for the container including means for retaining said sections in closed relation, said means comprising a pair of spaced fins adjacent to the bottom wall and a pair of spaced fins adjacent to the top wall of the container, said fins being adapted to snugly sandwich the container between them.

5. In a device for dispensing table implements such as knives, forks, and spoons, a flat container longitudinally split into separable sections and adapted to accommodate a plurality of like implements in stacked relation, one end wall of the container having a longitudinal slit coincident with the line of cleavage between said sections to permit the handles of said implements to project therethrough, and a holder adapted removably to receive the container endwise therein, said holder comprising base and cover elements, means carried by said elements for engaging the container to hold the latter in position, and means for movably supporting one of said elements to permit the container to be released.

6. In a device for dispensing table implements such as knives, forks, and spoons, a flat container longitudinally split into separable sections and adapted to accommodate a plurality of like implements in stacked relation, one end wall of the container having a longitudinal slit coincident with the line of cleavage between said sections to permit the handles of said implements to project therethrough, and a holder adapted removably to receive the container endwise therein, said holder comprising base and cover elements, means carried by said elements for engaging the container to hold the latter in position, and means for movably supporting the cover element to permit the container to be released.

7. In a device for dispensing table implements such as knives, forks, and spoons, a flat container longitudinally split into separable sections and adapted to accommodate a plurality of like implements in stacked relation, one end wall of the container having a longitudinal slit coincident with the line of cleavage between said sections to permit the handles of said implements to project therethrough, and a holder adapted removably to receive the container endwise therein, said holder comprising an upright support, a base to underlie the bottom wall of the container, a cover element pivotally mounted on said upright support, and means on said base and cover elements for engaging the slitted end wall of the container so as to hold the container in position.

8. In a device for dispensing table implements such as knives, forks, and spoons, a flat container longitudinally split into separable sections and adapted to accommodate a plurality of like implements in stacked relation, one end wall of the container having a longitudinal slit coincident with the line of cleavage between said sections to permit the handles of said implements to project therethrough, and a holder adapted removably to receive the container endwise therein, said holder comprising an upright support, a base to underlie the bottom wall of the container, a pair of spaced fins on said base adapted to sandwich the container between them, a cover element pivotally mounted on said upright support, and a pair of depending spaced fins on said cover element for sandwiching the upper portion of the container, said fins serving to retain said container sections in closed relation.

9. In a device for dispensing table implements such as knives, forks, and spoons, a flat container longitudinally spilt into separable sections and adapted to accommodate a plurality of like implements in stacked relation, one end wall of the container having a longitudinal slit coincident with the line of cleavage between said sections to permit the handles of said implements to project therethrough, and a holder adapted removably to receive the container endwise therein, said holder comprising an upright support, means for snugly engaging the container to retain its sections in closed relation, a base to underlie the the bottom wall of the container, and a weighted cover element pivotally mounted on said upright support.

10. In a device for dispensing table implements such as knives, forks, and spoons, a flat container adapted to accommodate a plurality of like implements in stacked relation, the inside width of the container being substantially equal to the width of said stack, and one end wall of the container having a longitudinal slit through which the handles of the implements may project, the bottom wall of said container being arranged at an obtuse angle to the slitted end wall so that when the latter is vertical the implements assume an inclined position, said container comprising separable sections disposed on opposite sides of said slit.

11. In a device for dispensing table implements such as knives, forks, and spoons, a flat container adapted to accommodate a plurality of like implements in stacked relation, the inside width of the container being substantially equal to the width of said stack, and one end wall of the container having a longitudinal slit through which the handles of the implements may project, the bottom wall of said container being arranged at an obtuse angle to the slitted end wall so that when the latter is vertical the implements assume an inclined position, and the top wall being parallel to the bottom wall, thereby imparting a rhomboidal shape to the container, said container comprising separable sections disposed on opposite sides of said slit.

12. In a device for dispensing table implements such as knives, forks, and spoons, a set of flat containers each of which is adapted to accommodate a plurality of like implements in stacked relation, the inside width of each container being substantially equal to the width of the stack which it accommodates, one end wall of each container having a longitudinal slit through which the handles of the implements may project, said container comprising separable sections disposed on opposite sides of said slit, and a common holder for removably receiving said containers endwise therein in side-by-side relation, said holder comprising an upright support, a base, a cover element pivoted to the upright support, and spaced depending fins carried by said cover element for snugly sandwiching said container between them, thereby retaining the sections of said containers in closed relation.

WILLIAM A. ZEIDLER, Sr.